UNITED STATES PATENT OFFICE.

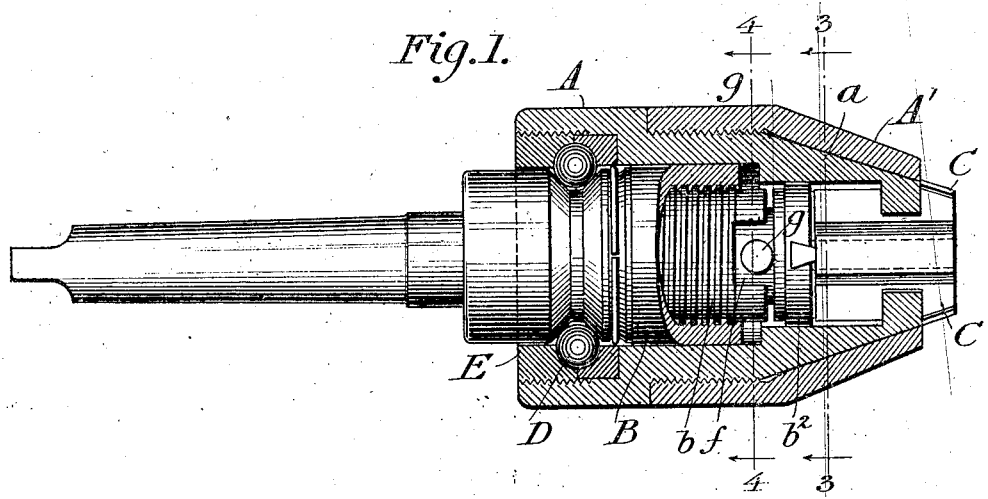
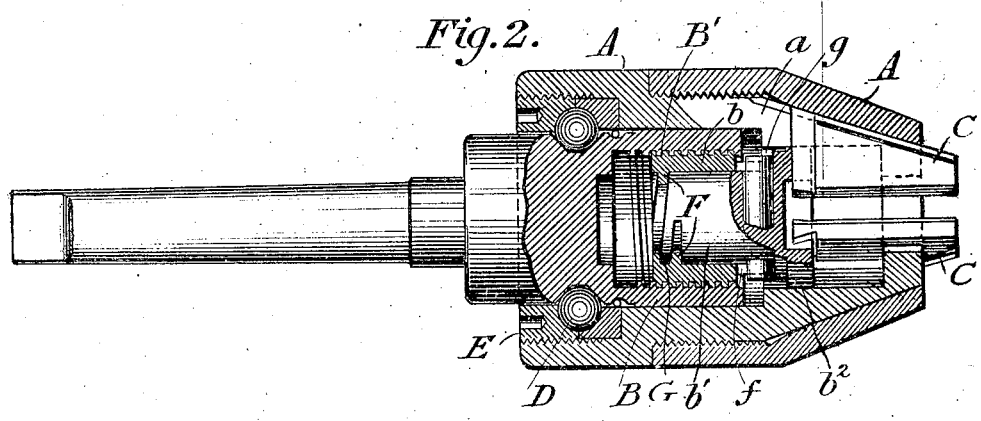
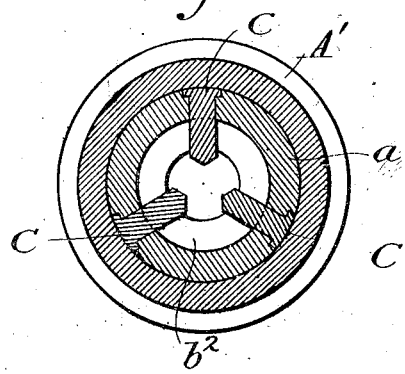
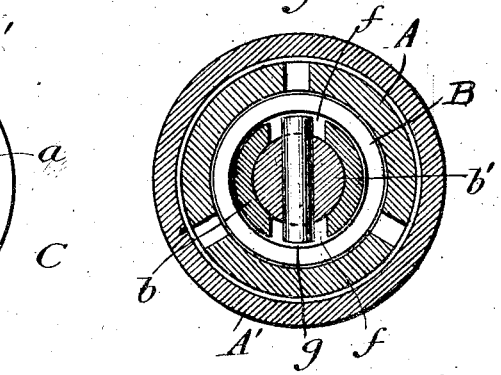

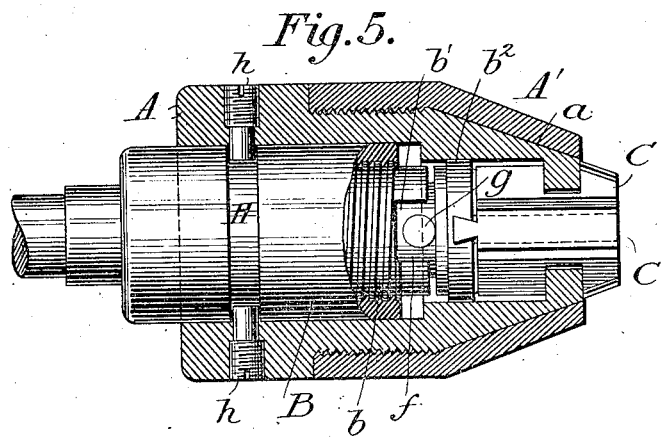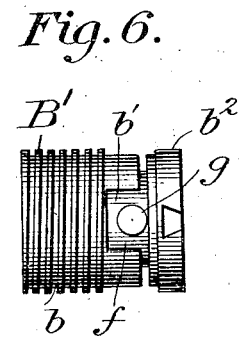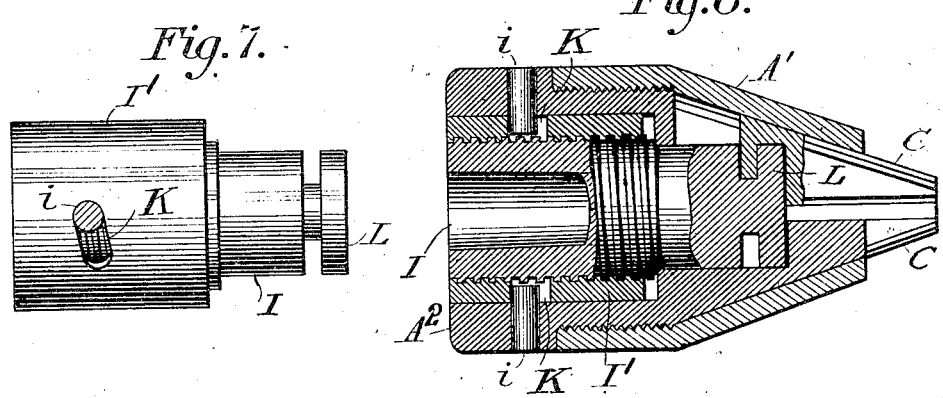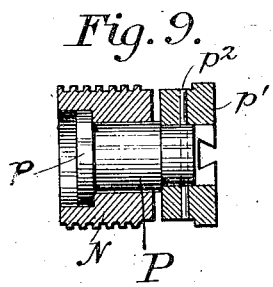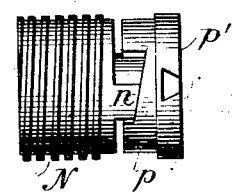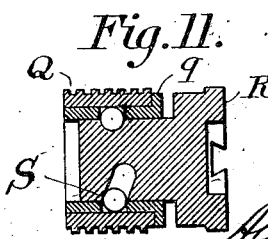

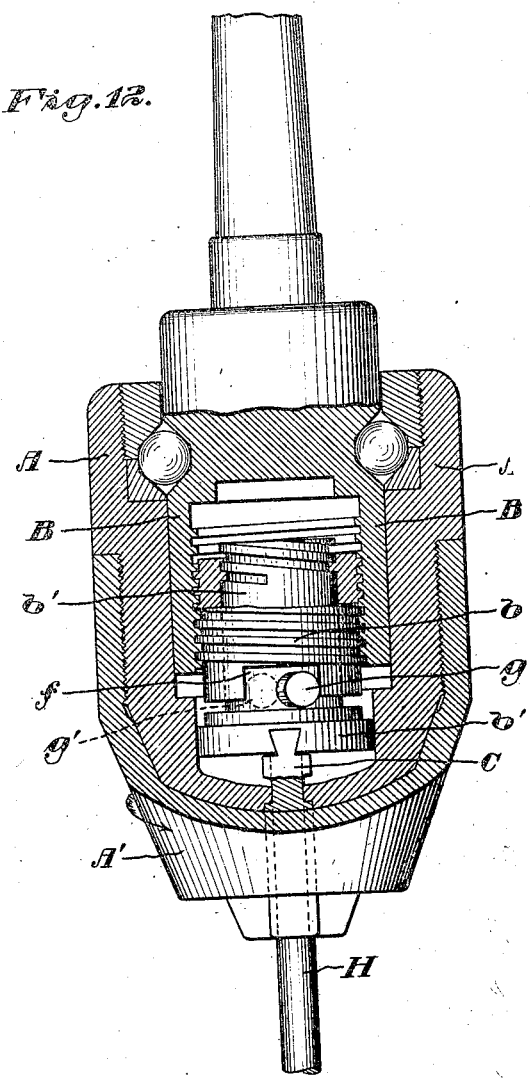

ALEXANDER P. MORROW, OF ELMIRA, NEW YORK, ASSIGNOR TO E. HORTON & SON COMPANY, OF WINDSOR LOCKS, CONNECTICUT, A CORPORATION OF CONNECTICUT.

DRILL-CHUCK.

1,150,142.

Specification of Letters Patent. Patented Aug. 17, 1915.

Application filed December 23, 1908. Serial No. 469,025.

*To all whom it may concern:*

Be it known that I, ALEXANDER P. MORROW, a citizen of the United States, residing at Elmira, in the county of Chemung and State of New York, have invented certain new and useful Improvements in Drill-Chucks; and I do hereby declare the following to be a full, clear, and exact description of the invention, such as will enable others skilled in the art to which it appertains to make and use the same.

My invention has for its object the improvement of chucks, and will be best understood by reference to the following description and accompanying drawings showing one selected embodiment thereof which I have chosen for purposes of illustration only.

In the drawings: Figure 1 is a vertical, longitudinal, sectional elevation of a chuck embodying my invention; Fig. 2 is a similar sectional view taken in a plane at right angles to the plane of Fig. 1; Fig. 3 is a transverse section taken on the line 3—3 of Fig. 1; Fig. 4 is a transverse section taken on the line 4—4 of Fig. 1; Fig. 5 is a vertical, longitudinal, sectional elevation of a chuck embodying my invention in a modified form; Fig. 6 is a detail plan view of the coupling shell and plug, detached; Fig. 7 is a plan view of parts of a chuck embodying my invention in a modified form; Fig. 8 is a vertical, longitudinal, sectional elevation of a chuck containing such modified embodiment; Fig. 9 is a detail sectional elevation of a modification; Fig. 10 is a plan view of the same; Fig. 11 is a vertical, sectional elevation of still another modification; and Fig. 12 is a perspective view drawn on an enlarged scale showing various parts broken away, in order to illustrate the mode of operation of the embodiment of my invention shown in Figs. 1, 2, 3 and 4.

Referring now to the drawings, particularly to Figs. 1, 2, 3 and 4, the tang of the chuck is shown as operatively integral with the cylindrical head B which is hollow at its outer end and internally screw-threaded, as at B', this thread being of sufficiently fine pitch to permit of firm setting of the chuck upon the work by the operation of said thread. Adapted to screw in and out of the head B, and provided with external threads for engagement with the threads upon the inside of the head B, is the coupling shell b, which is provided with a squared recess at its outer end, as shown at f. Adapted to screw in and out of the coupling shell, is the plug b'. In this illustrative embodiment of my invention the threads F and G are the releasing threads, and are shown as inclined in the same direction as, and of coarser pitch than the threads between the coupling shell b and the head B, these latter threads being the tightening threads; but I do not wish to be understood as limiting my invention to this specific arrangement. The plug b' is provided with the radially positioned pin g the ends of which are adapted to engage one end or the other of the squared recess f in the end of the coupling shell, according to the direction in which the parts may be turned. This engagement of the pin g with the ends of said recess f operates to limit the movement of the plug b' relatively to the shell b. The plug b' is provided upon its outer face with radial grooves in which are held the jaws C, in such a manner as to be radially movable in relation to each other and the plug b'. The jaws C are nested and adapted to slide in lengthwise slots provided in the frusto-conical portion a of the outer casing A of the chuck, said outer casing being adapted to be rotated in relation to the head B, and being for this purpose provided with an annular groove in its inner surface which confronts a similar groove in the outer surface of the head B, said grooves making a raceway for the spherical bearings D, or other suitable anti-friction devices. To permit the insertion of the bearings D, this raceway may be formed partly in the casing A and head B, and partly in a detachable member such as the annulus E, which may be screwed into the end of the casing, as shown. Any suitable connection may be employed between the jaws and the plug b' adapted to permit radial movement of the jaws relatively thereto. For this purpose I have shown, in Figs. 1 to 6 of the drawings, dove-tail grooves or recesses in the front of the plug and correspondingly shaped tenons on the rear ends of the jaws fitted in said grooves. Recesses may be provided along the margins of the slots in the frusto-conical portion a of the casing A and the jaws may have marginal ribs thereon engaging said recesses and resting upon the ledges thus formed, and by means of a frusto-conical sleeve A', fitting over the frusto-conical portion $a$ of the casing and secured thereon by screw-threads, the jaws are confined in the slots. To afford a firm hold upon the casing and sleeve when it is desired either to unscrew and retract the jaws, or to cause them to advance and grasp the shank of a drill or other work, the casing and sleeve may have exterior milled surfaces.

Having now described the construction and arrangement of parts in the preferred illustrative embodiment of my invention I will now describe its mode of operation, particularly referring to Fig. 12 of the drawings. The parts shown in full lines are in the closed position—that is, the chuck is shown as tightly grasping the drill shank H. It will be observed that the pin $g$ is hard pressed against the right hand end of the recess $f$ in the coupling shell $b$ and that consequently the plug $b'$ is in its farthest outward position. This tight set position of the parts has been brought about by the rotation of the outer casing A of the chuck in the direction indicated by the curved arrow shown upon the outer sleeve A'. Supposing now that it is desired to loosen the chuck from the drill shank H. The operator grasps the outside milled surface of the head B and its casing A and turns the head in the direction opposite to that indicated by the curved arrow before referred to. The only elements of the chuck which are movable relatively to the head B and which are directly connected to the casing A are the jaws C. Because of the fact that the jaws C are nested in the casing A as heretofore described the first reverse movement of the casing A is transmitted directly through the jaws to the plug $b'$ to which they are in turn connected. The plug $b'$ screws into the shell $b$, being relatively movable therein to the limited extent allowed it by the pin $g$.

In the structure shown in Figs. 1 to 6 and 12 the releasing thread is of steeper pitch and smaller in diameter than the tightening thread. Because of this there is less binding resistance between the plug $b'$ and its incasing shell $b$ than there is between the shell $b$ and the head B. Consequently upon the initial reverse movement being transmitted from the casing A through the jaws C to the plug $b'$ said plug will turn with ease relatively to its incasing shell $b$. In so doing the plug $b'$ will be screwed into the shell $b$ a short distance—until the pin $g$ shall have abutted against the end of the recess $f$ and shall have occupied the position noted by dotted lines at $g'$. This slight inward movement of the plug $b'$ will retract the jaws C a short distance and so will initially release the grip of the jaws C upon the drill shank H. This release of the grip of the jaws will result in the binding resistance of the tightening threads between the shell $b$ and the head B being reduced to a sufficient extent to allow the continued reverse movement of the casing A which results in the shell $b$ being unscrewed in relation to the head B, since the pin $g$ is now abutted against the left end of the recess $f$ in the shell $b$, resulting in movement being transmitted from the plug $b'$ to the shell $b$. This reverse movement is continued until the jaws C are sufficiently retracted to permit the removal of the drill, the shank of which they hold.

In tightening the chuck upon the drill the action is as follows:—The last movement of the parts having been a reverse movement, as just described, the position of the pin $g$ is as indicated in dotted lines at $g'$. The drill shank is now positioned between the jaws, and the casing A is turned in the other direction. The first movement of the casing A will, as before, be communicated through the jaws directly to the plug $b'$, and since the frictional resistance of the releasing threads between the plug $b'$ and its inclosing casing $b$ is less than that of the tightening threads between the casing $b$ and the head B, the plug $b'$ will turn relatively to the casing $b$ until the pin $g$ abuts against the right hand end of the recess $f$, as shown in full lines in Fig. 12. This relative movement between the plug $b'$ and its shell $b$ takes place before the jaws C get into gripping engagement with the drill shank, all tightening of the jaws upon the drill shank being accomplished through the tightening threads between the head B and the shell $b$, which is now being rotated because of the positive engagement of the pin $g$ against the end of the recess $f$. In this way, before the jaws C begin to tighten upon their work, the releasing device, as the plug $b'$ and its various connections may be termed, has already automatically become set, ready to perform its functions upon the first reverse movement of the manual parts. In this manner the setting and tightening of the jaws C upon their work is accomplished through the medium of the relatively fine and powerful tightening thread; and so far as this part of the operation of the chuck is concerned the plug $b'$ has no function whatever; but in reversing the chuck in order to release the work, another thread—the releasing thread— is initially thrown into action, which makes it possible because of the resultant easy initial retracting movement, to loosen the grip of the chuck upon the work no matter how firmly the tightening threads between the head B and the shell $b$ may have become bound because of the resistance and automatic tightening of the chuck which results, in the well known manner, from the resistance offered to the rotation of the drill.

In Fig. 5 of the drawings, instead of balls serving as a key to hold the casing and head together and prevent end movement, as well as to reduce friction, an annular recess H is formed in the periphery of the head B, to receive studs or pins $h$, which are screwed into interiorly-threaded sockets in the body of the casing, thus permitting rotation of the casing or head while preventing end movement, and dispensing with the ball-bearings. Otherwise the parts illustrated in Figs. 5 and 6 of the drawings are identical with the construction illustrated in Figs. 1 to 4 inclusive.

In Figs. 7 and 8 of the drawings, the main body of the head I is exteriorly screw-threaded and screwed into an interiorly screw-threaded tubular section I', which has a smooth exterior fitting into the smooth interior of the casing, and provision is made for effecting a slight rotary movement of the casing independently of the head and thereby releasing the grip of the jaws before the unscrewing movement of the casing begins, by providing a pin or pins $i$, which project through apertures or holes in the casing $A^2$, and engage inclined or cam slots K, in the section I'. Continued rotation of the casing after the pins $i$, reach the ends of the cam slots K, will cause the section I' of the head to rotate with the casing, while the main body of the head is held stationary, and in order that the jaws may travel around with the casing without affecting the head, as in the construction shown in Figs. 1 to 4 of the drawings, the front end of said main body or exteriorly-threaded section of the head is formed or provided with a button-like projection or flange L and the jaws are formed with hook-shaped ends engaging said button-like projection or flange so as to be forced out or drawn in thereby while free to travel around with the casing.

In Figs. 9 and 10 of the drawings, I have shown a coupling-section for connecting the jaws and head operating in a manner similar to the coupling section already described and shown in Figs. 1 to 6, but having a different form of cam-device for releasing the grip of the jaws. In this instance the tubular part N of the coupling-section is recessed at one end to receive and form an abutment for an annular flange $p$, at one end of the plug P which is fitted therein and provided with a head-piece $p'$, at its other end having cam surfaces for contact with co-acting cam surfaces $n$, on the adjacent end of the tubular part N. The head-piece $p'$ may be screwed upon the reduced threaded end of the plug P and keyed thereto or otherwise secured against rotation thereon, for instance, by means of a pin $p^2$, passing through the body of the head-piece and the end of the plug. The cam-faced projections $n$, on the tubular part N limit the movement of the plug, by contact with the shoulders formed at the ends of the recesses in the head-piece into which said projections enter, and the rear walls of said recesses are inclined to provide cam surfaces co-acting with said cam-faced projections. This construction permits a limited rotary movement of the plug P independently of the exteriorly screw-threaded sleeve or tubular part N, and releases the grip of the jaws, after which continued rotation of the casing will impart movement to said sleeve, by contact of the cam-faced projections with the side walls or ends of the recesses in the head piece $p'$.

In Fig. 11 of the drawings, I have shown a coupling section for connecting the jaws and head somewhat similar to the coupling sections already described, but having a clutch device for releasing the grip of the jaws. In this instance, the exteriorly-threaded sleeve, which is screwed into the interiorly-threaded socket in the main body of the head and which is denoted by the letter Q, has a bushing $q$ secured therein, said bushing having a hole or holes therethrough registering with an elongated recess or slot in the body of the plug R adapted to receive a ball S, by which the parts are prevented from coming apart but permitted a limited endwise and rotary movement; the ball and adjacent inclined wall of the slot serving to perform the functions of both the cam and stop devices shown in other figures of the drawings.

My invention comprehends broadly a chuck having work-engaging means and operating means therefor comprising two movable, interconnecting parts to receive and to convey motion in causing engagement and release of the work-engaging means, said parts having engaging means to effect a joint movement in tightening and releasing the work, and whereby one of said parts is movable with respect to the other, by a predominating, relatively fast movement to effect initial release of the work-engaging means and whereby the other of said parts is movable with respect to the first by a subsidiary, relatively slow movement, to finally tighten the hold of the work-engaging means. My invention also comprehends broadly a chuck wherein one only of said parts is movable, while the other is stationary to effect initial release of the work-engaging means by a relatively fast movement and whereby the other one of said parts is movable finally to tighten the hold of the work-engaging means by a slower movement. In the disclosed embodiment of the invention, the two movable parts are represented as interengaging, which is the preferred construction, but to which I am not limited. In defining the two parts as having "engaging means" to effect a joint movement and to effect initial release and final tightening, I use such term or expression in a broad and generic sense.

Having now described an illustrative embodiment of my invention and modifications thereof, to which specific structures, however, it is obvious my invention is not limited;

What I claim is:—

1. In a chuck, a revoluble case having movable jaws and a screw-connected sectional head within the case co-acting therewith for operating the jaws, means permitting a limited movement of the case and jaws independently of or without screwing or unscrewing the sections of the head and then causing a section of the head to turn with the case and thereby retract the jaws, together with means for releasing the grip of the jaws during such limited movement.

2. A chuck comprising a revoluble case having movable jaws and a head within the case consisting of rotatably connected sections, one of which is adapted to be moved endwise by the rotary movement of the case, for opening and closing the jaws, connections between the case and head whereby a limited rotary movement of the case relatively to the head is permitted on the initial reverse movement of the case and a section of the head then caused to move and open the jaws, together with means for relaxing the grip of the jaws during the aforesaid limited rotary movement of the case.

3. A chuck comprising a revoluble case and jaws adapted to be operated thereby, said case containing a sectional screw-threaded head adapted to be screwed up and unscrewed by the rotation of the case relatively to the head for opening and closing the jaws, means adapted to permit a limited rotary movement of the case before it commences to unscrew the head and to commence unscrewing as the rotation of the case is continued, together with means for relaxing the grip of the jaws to relieve the pressure on the screw-threads during the aforesaid limited rotary movement of the case.

4. In a chuck, a revoluble case and jaws adapted to be operated thereby, in combination with a head within the case constructed in sections one of which screws into the other to advance or retract the jaws, and a cam-device and connections by which a partial rotation of the case is permitted and the grip of the jaws released before either screw-threaded section of the head commences to turn.

5. In a chuck, a revoluble case and jaws adapted to be operated thereby, in combination with a head within the case constructed in screw-threaded sections, one section being made in separable parts, and cam and stop devices holding said separable parts together while permitting a partial rotation of the case without turning either section of the head, said stop-device being adapted to limit independent rotation of the case, and said cam device being adapted to release the grip of the jaws during the partial rotary movement of the case.

6. In a chuck, a revoluble case and jaws adapted to be operated thereby, in combination with a head within the case having a smooth cylindrical exterior, there being an annular raceway between the case and head, and means in said raceway serving as a key to prevent end movement, said head being constructed in sections one of which is screwed into the other, means permitting but limiting initial rotary movement of the case independently of the head together with means for releasing the grip of the jaws during such limited movement in the desired direction and then causing a threaded section of the head to turn with the case and retract the jaws.

7. In a drill chuck, radially movable jaws and operating means therefor comprising two sleeve sections, one movable relatively to the other and having interfitting tongues and grooves, the tongues being of less circumferential width than the grooves to allow a limited relative movement of one of the sleeves upon the other, said tongues and grooves being also provided with inclined bearing faces engaging each other for moving one sleeve axially to the other during such rotary movement.

8. In a drill chuck, a threaded head, a spindle journaled in the head and having a slight axial movement relatively thereto, radially movable jaws engaging the spindle, a threaded casing screwed upon the head and operatively connected to the jaws to move the latter radially as the casing is rotated, and means including a cam on the head for moving the spindle and jaws axially.

9. In a drill chuck, a head, a spindle journaled in the head and provided with an annular flange, jaws engaging the annular flange and movable radially toward and from the axis of the spindle, a casing rotatable and movable axially relatively to the head and operatively connected to the jaws to move the same radially, and means including a cam on the spindle for moving the spindle and jaws axially.

10. A chuck comprising a revoluble case and jaws adapted to be operated thereby, the said case containing a sectional screw threaded head adapted to be screwed up and unscrewed by the rotation of the case with reference to the relatively non-rotating portion of the head, for opening and closing the jaws, and means adapted to permit a limited rotary movement of the case before it commences to unscrew the head and to commence unscrewing as the rotation of the case is continued, whereby the grip of the jaws is relaxed to relieve the pressure on the main tightening up thread of the sectional head during the aforesaid limited rotary movement of the case.

11. In a drill-chuck, a revoluble case, a head, means whereby one is axially-movable relative to the other by rotating the case, and radially-movable jaws operatively-connected with the case and head and adapted to be opened and closed by rotating the case, the connection between the jaws and head including a cam and stop device which permits a preliminary limited movement of parts to relax the jaws.

12. In a drill-chuck, a case and head, means whereby one is axially-movable relative to the other by turning the case, radially-movable jaws operatively-connected to the case and head and operable to open and close by turning the case, the hereinbefore-recited elements including relatively rotatable parts, and a cam and stop device interposed between said relatively-rotatable parts which permits a preliminary independent turn of the case and limited movement of parts to relax the jaws.

13. In a drill chuck, a socketed head, a cam in said socket provided with an inclined bearing, an annular flange operatively connected to the head and having a slight axial movement relatively thereto, radially movable jaws engaging the flange, means for rotating said jaws and moving them radially, and additional means brought into action by the rotation of the first named means and coacting with the inclined bearing of the cam for moving said flange and jaws axially.

14. In a chuck, work engaging means and a single-manual operating means therefor, and means whereby by a uniform movement of said manual operating means in opposite directions, the work engaging means may be operated to open with a certain initial pressure and to close with a final different pressure respectively.

15. In a chuck, work-engaging means, and operating means therefor comprising two movable, interengaging parts, to receive and to convey motion in causing engagement and release of the work-engaging means, said parts having engaging means to effect a joint movement in tightening and releasing the work, and whereby one of said parts is movable with respect to the other, by a predominating, relatively fast movement, to effect initial release of the work-engaging means, and whereby the other of said parts is movable with respect to the first, by a subsidiary, relatively slow movement, to finally tighten the hold of the work-engaging means.

16. In a chuck, work-engaging means, and operating means therefor comprising two movable, interengaging parts, to receive and to convey motion in causing engagement and release of the work-engaging means, said parts having engaging means to effect a joint movement in tightening and releasing the work, and whereby one only of said parts is movable, while the other is stationary, to effect initial release of the work-engaging means by a relatively fast movement and whereby the other only of said parts is movable, to finally tighten the hold of the work-engaging means by a slower movement.

17. In a chuck, work-engaging means and operating means therefor comprising two movable, interconnecting parts to receive and to convey motion in causing engagement and release of the work-engaging means, said parts having engaging means to effect a joint movement in tightening and releasing the work, and whereby one of said parts is movable with respect to the other by a predominating, relatively fast movement, to effect initial release of the work-engaging means, and whereby the other of said parts is movable with respect to the first by a subsidiary, relatively slow movement, to finally tighten the hold of the work-engaging means.

In testimony whereof I affix my signature, in presence of two witnesses.

ALEXANDER P. MORROW.

Witnesses:
  Eugene Custord,
  Wm. W. Hervey.

Correction in Letters Patent No. 1,150,142.

It is hereby certified that in Letters Patent No. 1,150,142, granted August 17, 1915, upon the application of Alexander P. Morrow, of Elmira, New York, for an improvement in "Drill-Chucks," an error appears in the printed specification requiring correction as follows: Page 1, line 59, strike out the words, syllables, punctuation, and reference-letter ", is the plug $b'$. In this illus-" and insert *b, and provided with exter-;* and that the said Letters Patent should be read with this correction therein that the same may conform to the record of the case in the Patent Office.

Signed and sealed this 28th day of September, A. D., 1915.

[SEAL.]
J. T. NEWTON,
*Acting Commissioner of Patents.*